(12) United States Patent
Miao

(10) Patent No.: US 11,726,359 B2
(45) Date of Patent: Aug. 15, 2023

(54) DISPLAY MODULE AND ELECTRONIC DEVICE

(71) Applicant: VIVO MOBILE COMMUNICATION CO., LTD., Guangdong (CN)

(72) Inventor: Guosheng Miao, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 17/680,389

(22) Filed: Feb. 25, 2022

(65) Prior Publication Data

US 2022/0179255 A1    Jun. 9, 2022

Related U.S. Application Data

(63) Continuation of application No. PCT/CN2020/107769, filed on Aug. 7, 2020.

(30) Foreign Application Priority Data

Aug. 29, 2019    (CN) .......................... 201910806711.0

(51) Int. Cl.
| | | |
|---|---|---|
| G02F 1/1333 | (2006.01) | |
| G02F 1/133 | (2006.01) | |
| G02F 1/1335 | (2006.01) | |
| G06V 40/13 | (2022.01) | |
| G02F 1/1368 | (2006.01) | |

(52) U.S. Cl.
CPC ...... *G02F 1/13338* (2013.01); *G02F 1/13312* (2021.01); *G02F 1/133512* (2013.01); *G06V 40/1318* (2022.01); *G02F 1/1368* (2013.01)

(58) Field of Classification Search
CPC ............ G02F 1/13338; G02F 1/13312; G02F 1/133512; G02F 1/1368; G06V 40/1318
USPC ............................................... 349/12
See application file for complete search history.

(56) References Cited

U.S. PATENT DOCUMENTS

| | | |
|---|---|---|
| 5,828,427 A | 10/1998 | Faris |
| 2007/0058120 A1 | 3/2007 | Nagai |
| 2007/0253606 A1 | 11/2007 | Higuchi |

(Continued)

FOREIGN PATENT DOCUMENTS

| | | |
|---|---|---|
| CN | 204331222 U | 5/2015 |
| CN | 106709455 A | 5/2017 |

(Continued)

OTHER PUBLICATIONS

Search Report for Chinese Application No. 201910806711.0, dated Mar. 4, 2020, 6 Pages.

(Continued)

*Primary Examiner* — Charles S Chang
(74) *Attorney, Agent, or Firm* — Brooks Kushman P.C.

(57) ABSTRACT

A display module and an electronic device are disclosed, the display module includes a first substrate, a surface of one side of the first substrate is provided with an image sensor, a color filter layer, and a black matrix, a surface of the other side of the first substrate is provided with a collimator, the color filter layer and the black matrix are disposed in a same layer, the image sensor is located between the black matrix and the first substrate, and the collimator and the image sensor are arranged at intervals along a direction perpendicular to the first substrate. The image sensor is corresponding to the black matrix.

15 Claims, 2 Drawing Sheets

(56) References Cited

U.S. PATENT DOCUMENTS

| | | |
|---|---|---|
| 2016/0266695 A1 | 9/2016 | Bae et al. |
| 2019/0026527 A1 | 1/2019 | He et al. |
| 2019/0056613 A1 | 2/2019 | Wang et al. |
| 2020/0293740 A1 | 9/2020 | Tao et al. |
| 2020/0356749 A1 | 11/2020 | Ye |
| 2021/0174049 A1 | 6/2021 | Hai et al. |
| 2021/0326555 A1 | 10/2021 | Hu |
| 2021/0406503 A1* | 12/2021 | Hu ..................... G02F 1/13318 |

FOREIGN PATENT DOCUMENTS

| | | |
|---|---|---|
| CN | 106773219 A | 5/2017 |
| CN | 107340626 A | 11/2017 |
| CN | 107958237 A | 4/2018 |
| CN | 208141087 U | 11/2018 |
| CN | 109239938 A | 1/2019 |
| CN | 109426034 A | 3/2019 |
| CN | 109541857 A | 3/2019 |
| CN | 208888832 U | 5/2019 |
| CN | 109886118 A | 6/2019 |
| CN | 110008885 A | 7/2019 |
| CN | 110023956 A | 7/2019 |
| CN | 110133892 A | 8/2019 |
| CN | 110147009 A | 8/2019 |
| CN | 110543847 A | 12/2019 |
| JP | H0622250 A | 1/1994 |
| JP | 2007079115 A | 3/2007 |
| JP | 2009085593 A | 4/2009 |
| JP | 2018537845 A | 12/2018 |

OTHER PUBLICATIONS

First Office Action for Chinese Application No. 201910806711.0, dated Aug. 4, 2020, 10 Pages.
International Search Report and Written Opinion for Application No. PCT/CN20120/107769, dated Oct. 26, 2020, 8 Pages.
Extended European Search Report for Application No. 20856723.0-1020, dated Aug. 2, 2022, 8 Pages.
First Office Action for Japanese Application No. 2022-513312, dated Mar. 7, 2023, 5 Pages.

* cited by examiner

DISPLAY MODULE AND ELECTRONIC DEVICE

CROSS-REFERENCE TO RELATED APPLICATIONS

This application is a continuation of PCT International Application No. PCT/CN2020/107769 filed on Aug. 7, 2020, which claims priority to Chinese Patent Application No. 201910806711.0 filed on Aug. 29, 2019, which are incorporated herein by reference in their entireties.

TECHNICAL FIELD

The present disclosure relates to the field of display apparatus technologies, and in particular, to a display module and an electronic device.

BACKGROUND

A fingerprint module is one of core components of an electronic device. With the continuous development of the electronic device industry, people have growing performance requirements for the fingerprint module, which brings greater challenges to structural design of the fingerprint module.

The structure of the fingerprint module is relatively diverse, and an optical fingerprint module that can be disposed under a display screen may improve the appearance of the electronic device. Therefore, this fingerprint module is used more and more widely. There is a fingerprint recognition region on the display screen, and when a user places a finger on the fingerprint recognition region, the fingerprint module under the fingerprint recognition region may recognize fingerprint information of the user.

The foregoing fingerprint module is usually disposed in a part of the electronic device, so the fingerprint recognition region of the display screen is relatively small, and the user needs to place the finger in a designated fingerprint recognition region for fingerprint recognition, which results in low fingerprint recognition efficiency.

SUMMARY

The present disclosure provides a display module and an electronic device to solve the problem of low fingerprint recognition efficiency. To solve the foregoing problem, the following technical solutions are used in the present disclosure:

A display module, including a first substrate, a surface of one side of the first substrate being provided with an image sensor, a color filter layer, and a black matrix, a surface of the other side of the first substrate being provided with a collimator, the color filter layer and the black matrix being disposed in a same layer, the image sensor being located between the black matrix and the first substrate, and the collimator and the image sensor being arranged at intervals along a direction perpendicular to the first substrate.

An electronic device, including the foregoing display module.

The technical solutions used in the present disclosure can achieve the following beneficial effects:

In the display module provided in the present disclosure, both the collimator and the image sensor are disposed on the first substrate. The image sensor is corresponding to the black matrix, and the black matrix has a relatively large area in the display module. Therefore, the collimator and the image sensor may be distributed on the display module in a large area, so that an area of the fingerprint recognition region on the display module is enlarged, and the user may freely choose a position to place the finger, thereby improving the fingerprint recognition efficiency.

BRIEF DESCRIPTION OF DRAWINGS

The accompanying drawings described herein are used to provide a further understanding of the present disclosure and constitute a part of the present disclosure. The illustrative embodiments of the present disclosure and descriptions thereof are used to explain the present disclosure, and do not constitute any improper limitation on the present disclosure. In the accompanying drawings.

REFERENCE SIGNS 110-second substrate, 120-first substrate, 130-color filter layer, 140-black matrix, 150-collimator, 160-image sensor, 161-photodiode, 162-first thin film transistor, 170-transparent cover plate, 180-second polarizer, 190-first polarizer, 220-second thin film transistor, 230-liquid crystal layer, 240-frame sealant, 250-backlight module, 300-finger, 310-fingerprint valley, and 320-fingerprint ridge.

DETAILED DESCRIPTION

To make the objectives, technical solutions, and advantages of the present disclosure clearer, the following clearly and completely describes the technical solutions of the present disclosure with reference to specific embodiments of the present disclosure and the accompanying drawings. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

The following describes in detail the technical solutions disclosed in the embodiments of the present disclosure with reference to the accompanying drawings.

Figure 1:
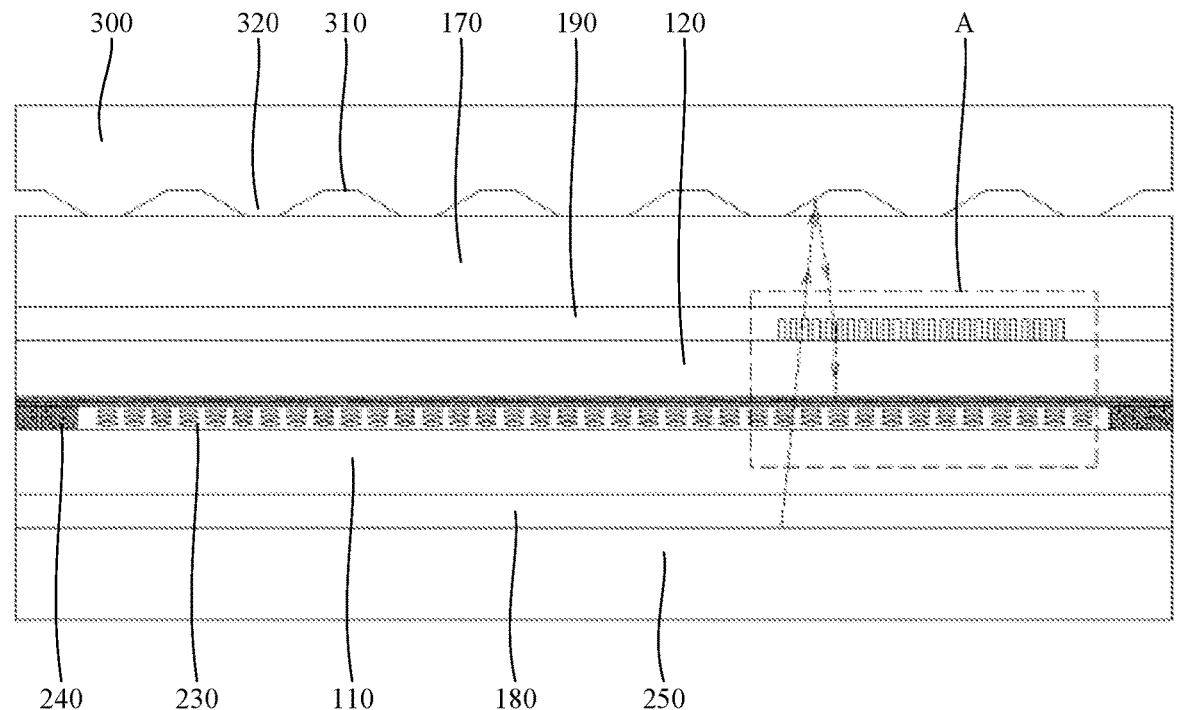
FIG. 1 is a schematic diagram of a partial structure of an electronic device according to an embodiment of the present disclosure.
Figure 2:
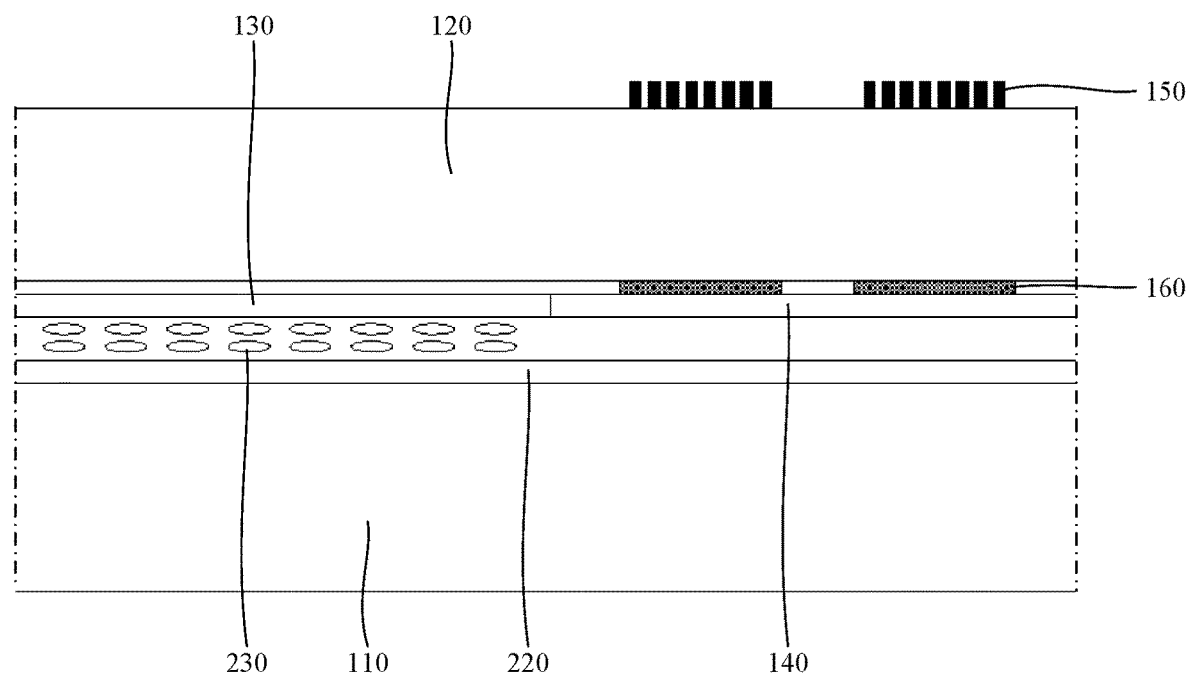
FIG. 2 is a partially enlarged view of a part A in FIG. 1.

As shown in FIG. 1 and FIG. 2, the embodiments of the present disclosure disclose a display module, and the display module may be applied to an electronic device. The display module may specifically include a first substrate 120 and a second substrate 110, and the second substrate 110 and the first substrate 120 may be stacked. A surface of one side of the first substrate 120 facing the second substrate 110 is provided with an image sensor 160, a color filter layer 130, and a black matrix 140. The color filter layer 130 and the black matrix 140 are disposed in a same layer. Optionally, the color filter layer 130 may include a plurality of red filter layers, yellow filter layers, and blue filter layers, and all of these filter layers may be arranged in an array. The black matrix 140 may fill gaps between adjacent groups of the red filter layer, the yellow filter layer, and the blue filter layer, thereby shielding a wiring structure. Therefore, a distribution area of the black matrix 140 in the display module is relatively large, basically corresponding to an entire display region of the display module.

The image sensor 160 is corresponding to the black matrix 140, and the image sensor 160 is located between the black matrix 140 and the first substrate 120. A surface of one side of the first substrate 120 facing away from the second substrate 110 is provided with a collimator 150, and the collimator 150 and the image sensor 160 are arranged at intervals along a direction perpendicular to the first substrate 120. The collimator 150 and the image sensor 160 herein may be used together for fingerprint recognition. Optionally, the collimator 150 is provided with a plurality of light transmission holes, and axes of these light transmission holes may be perpendicular to the image sensor 160. The collimator 150 may control a luminous flux passing through the collimator 150 according to the principle of pin-hole imaging. The image sensor 160 may sense light, and may convert a light signal into an electrical signal.

In addition, the display module further includes a transparent cover plate 170, a first polarizer 190, and a second polarizer 180. The second polarizer 180 is disposed on a side of the second substrate 110 facing away from the first substrate 120, the first polarizer 190 is disposed on a side of the first substrate 120 facing away from the second substrate 110, and the transparent cover plate 170 is disposed on a side of the first polarizer 190 facing away from the first substrate 120.

When the user places a finger 300 on the transparent cover plate 170, a light in the display module is reflected by a fingerprint of the user (for details, refer to an optical path indicated by a dashed line with arrow in FIG. 1). A fingerprint valley 310 and a fingerprint ridge 320 of the finger 300 of the user have different reflection effects on light, and therefore, the light reflected by the finger 300 carries fingerprint information of the user. The reflected light irradiates the image sensor 160 through the light transmission holes of the collimator 150, and the image sensor 160 senses a light signal, and then converts the light signal representing the fingerprint information into an electrical signal. The electrical signal may be transmitted to a main board of the electronic device, and the main board may be used to judge whether the obtained fingerprint information is consistent with pre-stored fingerprint information, thereby judging whether an access operation of the user is valid.

In the display module disclosed in the embodiments of the present disclosure, both the collimator 150 and the image sensor 160 are disposed on the first substrate 120, the collimator 150 and the image sensor 160 are arranged at intervals along the direction perpendicular to the first substrate 120, and the image sensor 160 is corresponding to the black matrix 140. The black matrix 140 has a relatively large area in the display module, and therefore, the collimator 150 and the image sensor 160 may be distributed on the display module in a large area, so that an area of the fingerprint recognition region on the display module is enlarged, and the user may freely choose a position to place the finger 300, thereby improving the fingerprint recognition efficiency. In addition, a process of disposing the collimator 150 and the image sensor 160 on the first substrate 120 is relatively simple. Therefore, when the collimator 150 and the image sensor 160 are disposed in a large area, costs of the display module may not be too high.

Specifically, the collimator 150 may be located between the first substrate 120 and the first polarizer 190. However, since the collimator 150 has a specific thickness, a thickness of the entire display module may be increased when the collimator 150 is disposed in this way, resulting in the increase of the thickness of the display module. Therefore, a surface of one side of the first polarizer 190 facing the first substrate 120 may be provided with a concave portion, and the collimator 150 is located in the concave portion. At this time, the collimator 150 may make full use of a space occupied by the first polarizer 190, but basically does not occupy additional space, thereby reducing the thickness of the display module. Optionally, the concave portion herein may be formed by processes such as exposure.

Optionally, since the image sensor 160 is relatively thin, in order to simplify a molding process of the image sensor 160, the image sensor 160 may be disposed on a surface of one side of the first substrate 120 facing away from the collimator 150. For example, the image sensor 160 may be formed on a surface of the first substrate 120 by coating or the like.

As described above, the black matrix 140 is distributed in a large area in the display module, so corresponding to the black matrix 140, the collimator 150 and the image sensor 160 may also be distributed in a large area, thereby further expanding the fingerprint recognition region. That is, the display module has a fingerprint recognition region, both the collimator 150 and the image sensor 160 are located in the fingerprint recognition region, and the fingerprint recognition region extends to an edge of the first substrate 120, so that a region covered by the collimator 150 and the image sensor 160 is substantially the same size as a region where the first substrate 120 is located, thereby realizing full-screen unlocking.

In an optional embodiment, in the direction perpendicular to the first substrate 120, a center of a projection of the collimator 150 overlaps with a center of a projection of the image sensor 160. The collimator 150 and the image sensor 160 may have a same shape, and when the centers of the projections thereof overlap, relative positions thereof are more accurate, which makes arrangement of the collimator 150 and the image sensor 160 easier, thereby improving accuracy of fingerprint recognition.

There may be one collimator 150 and one image sensor 160, but this structure has higher requirements on the molding process, and an area of a single collimator 150 or an image sensor 160 is too large, utilization of some regions is low, which may lead to high costs of the display module. In view of this, a plurality of collimators 150 and a plurality of image sensors 160 may be disposed, the plurality of collimators 150 and the plurality of image sensors 160 are all disposed at intervals, and the plurality of collimators 150 and the plurality of image sensors 160 are arranged in one-to-one correspondence, so that the collimator 150 and the image sensor 160 are easier to form, and areas thereof are appropriately reduced, thereby reducing the costs of the display module. Certainly, the relative positions of the corresponding collimator 150 and the image sensor 160 are easier to be ensured in this structure, thereby improving the accuracy of fingerprint recognition.

Figure 3:
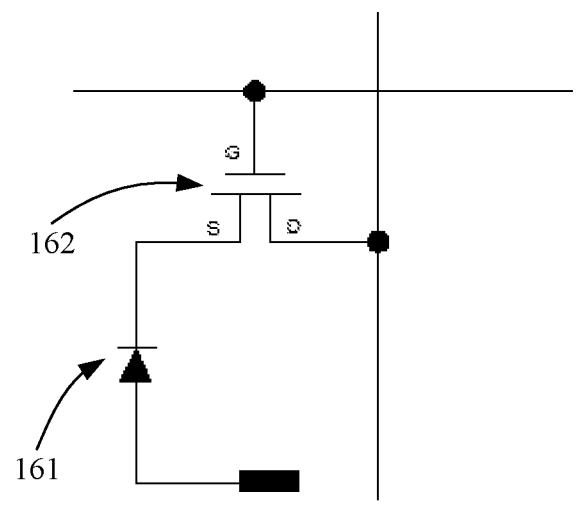
FIG. 3 is a schematic diagram of an optical-to-electrical conversion unit in an electronic device according to an embodiment of the present disclosure.

Specifically, a single image sensor 160 may include only one optical-to-electrical conversion unit. In another embodiment, the image sensor 160 may include a plurality of optical-to-electrical conversion units connected in series. As shown in FIG. 3, the optical-to-electrical conversion unit includes a photodiode 161 and a first thin film transistor 162, and the photodiode 161 is electrically connected to the first thin film transistor 162. Specifically, the first thin film transistor 162 has a source (namely, an S pole in the figure), a drain (namely, a D pole in the figure), and a gate (namely, a G pole in the figure), the photodiode 161 is electrically connected to the source, the drain may be electrically connected to a data line, and the gate may be electrically connected to a gate line. The light reflected by the fingerprint may be projected onto the photodiode 161, causing a resistance value of the photodiode 161 to change, resulting in a leakage current signal. The photodiode 161 transmits the leakage current signal to a corresponding signal receiving unit through the first thin film transistor 162 in a conducting state, so as to recognize the fingerprint information.

In a further embodiment, a surface of one side of the second substrate 110 facing the first substrate 120 is provided with a second thin film transistor 220, a liquid crystal layer 230 is disposed between the second substrate 110 and the first substrate 120, and an edge of the liquid crystal layer 230 is provided with frame sealant 240. In other words, the display module may be a liquid crystal display module, so as to achieve the purpose of setting a fingerprint recognition structure under the screen in the liquid crystal display module. Certainly, the structure disclosed in the embodiments of the present disclosure may also be applied to an OLED (Organic Light-Emitting Diode) display module, an AMOLED (Active-matrix organic light-emitting diode) display modules, and other types of display modules.

The embodiments of the present disclosure further disclose an electronic device, including the display module described in any one of the foregoing embodiments. Optionally, when the display module is a liquid crystal display module, the electronic device may further include a backlight module 250, and the backlight module 250 may be disposed on a side of the second polarizer 180 facing away from the second substrate 110. The backlight module 250 may emit light to provide a light source for the display module. Since the collimator 150 and the image sensor 160 are disposed above the backlight module 250, the backlight module 250 may not affect a normal operation of the collimator 150 and the image sensor 160.

The electronic device disclosed in the embodiments of the present disclosure may be a smartphone, a tablet computer, an e-book reader, or a wearable device. Certainly, the electronic device may also be another device, which is not limited in this embodiment of the present disclosure.

The foregoing embodiments of the present disclosure focus on describing differences between the embodiments, and different optimization features of the embodiments may be combined to form better embodiments provided that they are not contradictory. Considering brevity, details are not described herein again.

The foregoing descriptions are merely embodiments of the present disclosure, but are not intended to limit the present disclosure. For a person skilled in the art, various modifications and changes may be made to the present disclosure. Any modification, equivalent replacement, or improvement made without departing from the spirit and principle of the present disclosure shall fall within the scope of the claims of the present disclosure.

What is claimed is:

1. A display module, comprising a first substrate, a surface of one side of the first substrate being provided with an image sensor, a color filter layer, and a black matrix, a surface of the other side of the first substrate being provided with a collimator, the color filter layer and the black matrix being disposed in a same layer, the image sensor being located between the black matrix and the first substrate, and the collimator and the image sensor being arranged at intervals along a direction perpendicular to the first substrate;
   wherein the other side of the first substrate facing away from the image sensor is provided with a first polarizer, a surface of one side of the first polarizer facing the first substrate is provided with a concave portion, and the collimator is located in the concave portion.

2. The display module according to claim 1, wherein the collimator is provided with a plurality of light transmission holes, and axes of the light transmission holes are perpendicular to the image sensor.

3. The display module according to claim 1, wherein the display module has a fingerprint recognition region, both the collimator and the image sensor are located in the fingerprint recognition region, and the fingerprint recognition region extends to an edge of the first substrate.

4. The display module according to claim 1, wherein in the direction perpendicular to the first substrate, a center of a projection of the collimator overlaps with a center of a projection of the image sensor.

5. The display module according to claim 1, wherein there are a plurality of collimators and image sensors, the plurality of collimators and the plurality of image sensors are all disposed at intervals, and the plurality of collimators and the plurality of image sensors are arranged in one-to-one correspondence.

6. The display module according to claim 1, wherein the image sensor comprises a plurality of optical-to-electrical conversion units connected in series, the optical-to-electrical conversion unit comprises a photodiode and a first thin film transistor, and the photodiode is electrically connected to the first thin film transistor.

7. The display module according to claim 1, wherein the display module further comprises a second substrate, a surface of one side of the second substrate facing the first substrate is provided with a second thin film transistor, and a liquid crystal layer is disposed between the second substrate and the first substrate.

8. An electronic device, comprising a display module, the display module comprising a first substrate, a surface of one side of the first substrate being provided with an image sensor, a color filter layer, and a black matrix, a surface of the other side of the first substrate being provided with a collimator, the color filter layer and the black matrix being disposed in a same layer, the image sensor being located between the black matrix and the first substrate, and the collimator and the image sensor being arranged at intervals along a direction perpendicular to the first substrate;
   wherein the other side of the first substrate facing away from the image sensor is provided with a first polarizer, a surface of one side of the first polarizer facing the first substrate is provided with a concave portion, and the collimator is located in the concave portion.

9. The electronic device according to claim 8, wherein the collimator is provided with a plurality of light transmission holes, and axes of the light transmission holes are perpendicular to the image sensor.

10. The electronic device according to claim 8, wherein the display module has a fingerprint recognition region, both the collimator and the image sensor are located in the fingerprint recognition region, and the fingerprint recognition region extends to an edge of the first substrate.

11. The electronic device according to claim 8, wherein in the direction perpendicular to the first substrate, a center of a projection of the collimator overlaps with a center of a projection of the image sensor.

12. The electronic device according to claim 8, wherein there are a plurality of collimators and image sensors, the plurality of collimators and the plurality of image sensors are all disposed at intervals, and the plurality of collimators and the plurality of image sensors are arranged in one-to-one correspondence.

13. The electronic device according to claim 8, wherein the image sensor comprises a plurality of optical-to-electrical conversion units connected in series, the optical-to-electrical conversion unit comprises a photodiode and a first thin film transistor, and the photodiode is electrically connected to the first thin film transistor.

14. The electronic device according to claim 8, wherein the display module further comprises a second substrate, a surface of one side of the second substrate facing the first substrate is provided with a second thin film transistor, and a liquid crystal layer is disposed between the second substrate and the first substrate.

15. The electronic device according to claim 8, further comprising a backlight module, the display module further comprising a second substrate, a side of the second substrate facing away from the first substrate being provided with a second polarizer, and the backlight module being disposed on a side of the second polarizer facing away from the second substrate.

\* \* \* \* \*